United States Patent [19]

Plueddemann

[11] 4,248,761
[45] Feb. 3, 1981

[54] METHOD OF PRODUCING IMPROVED VINYL CHLORIDE PLASTISOL COATING COMPOSITIONS

[75] Inventor: Edwin P. Plueddemann, Midland, Mich.

[73] Assignee: Dow Corning Corporation, Midland, Mich.

[21] Appl. No.: 116,714

[22] Filed: Jan. 30, 1980

Related U.S. Application Data

[62] Division of Ser. No. 947,324, Oct. 2, 1978.

[51] Int. Cl.$^3$ ............................ C08K 3/00; C08K 3/10
[52] U.S. Cl. .................................... 260/42; 260/42.49; 525/6
[58] Field of Search ............... 525/6; 260/42 R, 42.49

[56] References Cited

U.S. PATENT DOCUMENTS

| | | | |
|---|---|---|---|
| 3,248,358 | 4/1966 | Smith et al. | 260/41 |
| 3,350,345 | 10/1967 | Vanderbilt et al. | 260/41.5 |
| 3,949,140 | 4/1976 | Biefeld et al. | 525/6 |
| 3,998,985 | 12/1976 | Kitaj | 427/386 |

FOREIGN PATENT DOCUMENTS

| | | |
|---|---|---|
| 952991 | 3/1964 | United Kingdom . |
| 1113635 | 5/1968 | United Kingdom . |
| 1485517 | 9/1977 | United Kingdom . |

*Primary Examiner*—Harry Wong, Jr.
*Attorney, Agent, or Firm*—James E. Bittell

[57] ABSTRACT

A method is disclosed for producing an improved polyvinyl chloride plastisol or organosol coating composition having improved adhesion to glass, metal or fabrics. The composition is obtained by adding to the plastisol or organosol from 0.1 to 2 weight percent of a devolatilized product of hydrolysis of an aminofunctional organotrialkoxysilane of the formula $(RO)_3SiCH_2CH_2CH_2NH-(CH_2CH_2NH)_xH$ wherein R is a monovalent alkyl radical of from 1 to 3 carbon atoms and x is zero or 1 and optionally a filler. The silane is hydrolyzed with at least 0.5 moles of water per mole of silane. The compositions are stabilized in respect to viscosity by including 0.5 to 1.1 mole per mole of primary amino group in the hydrolyzed silane product of a compatible carboxylic acid boiling above 150° C. at atmospheric pressure.

2 Claims, No Drawings

METHOD OF PRODUCING IMPROVED VINYL CHLORIDE PLASTISOL COATING COMPOSITIONS

This is a division of application Ser. No. 947,324, filed Oct. 2, 1978.

BACKGROUND OF THE INVENTION

This invention relates to the production of polyvinyl chloride plastisol and organosol coating compositions which exhibit improved adhesion when fused on glass, metal and fabric substrates. In particular, it relates to such coating compositions containing a hydrolysis product of an aminofunctional organotrialkoxysilane.

Polyvinyl chloride (PVC) plastisols are dispersions in plasticizers of fine particle size PVC resins. The plasticizers are simply organic solvents that solubilize the resin at elevated temperatures to give a homogeneous melt that cools to a tough flexible vinyl product. Volatile liquids are sometimes included in the compositions to reduce viscosity in which case the dispersions are referred to as organosols. It is well known that coatings may be formed on many substrates by applying a PVC plastisol or organosol to the surface of the substrate and heating the combination until the plastisol or organosol fuses. Upon cooling a tough homogeneous coating is obtained.

One problem that has limited the application of PVC plastisol and organosol coating compositions is the poor adhesion of the coatings to many surfaces. Many attempts have been made to improve the adhesion of the coatings. Treatment of the surfaces with primers before applying the coating is known to improve adhesion, but is often commercially undesirable because of an additional process step involved. Alternatively, several adhesion promoting additives have been suggested for use in plastisol coating compositions. Such additives as phenolic resin and vinyl chloride-vinyl acetate copolymers have been used in plastisol compositions but in many cases the adhesion of the coatings is not as high as would be desirable. On many instances the additives may result in undesirable side effects such as excessive increases in viscosity of the compositions during storage.

It is also known from U.S. Pat. No. 3,998,985 and Great Britain Pat. No. 952,991 to add a mixture of an amino-organosilicon compound and an organic epoxide compound to PVC plastisols to improve the adhesion of coatings to glass and metal surfaces. Also in Great Britain Pat. No. 1,113,635 it is taught that adding an amino-organoalkoxysilane without an epoxy compound to a PVC plastisol or organosol improves the adhesion of a coating.

More specifically, it is stated in U.S. Pat. No. 3,248,358 that adherent coatings can be produced from compositions containing vinyl halide polymer, an organic solvent and an amino-organosilicon compound (i.e., a hydrocarbonoxysilane or a siloxane). It is further taught that it is desirable to reduce the amount of amino-organosilicon compound required in the composition to obtain the desired adhesion for both economic reasons and to reduce the amount of discoloration caused by the amino-organosilicon compound. One such method is taught in U.S. Pat. No. 3,248,358, in which the vinyl halide resin and the amino-organosilicon compound are mixed prior to incorporation of the vinyl halide resin into the plasticizer to form the plastisol or organosol. This method of employing the amino-organosilicon compound requires a separate process step to treat the PVC resin before a plastisol is formed. In many cases it would be more advantageous if the PVC plastisol user could simply modify a conventional PVC plastisol to obtain the coating adhesion required for a particular application.

Accordingly, it is a purpose of the present invention to provide an improved method of employing amino-organosilicon compounds to modify a conventional PVC plastisol after the PVC resin and plasticizer have been combined to form the plastisol. Further it is a purpose of the present invention to provide a method of further improving the adhesion of PVC plastisol coatings while employing minimum amounts of the amino-organosilicon compounds. It is also a purpose of the present invention to reduce such undesirable side effects as viscosity increase in the plastisol and discoloration in the coating while maintaining the improved adhesion of the coating.

It is known from U.S. Pat. No. 3,350,345 to partially hydrolyze functional organoalkoxysilanes including aminofunctional organoalkoxysiloxanes prior to treating siliceous filler surfaces with the silanes to improve the adhesion of the filler surfaces to rubber. One of the ways disclosed for treating siliceous fillers was separate addition to the rubber of the partially hydrolyzed silane and the siliceous filler. There is no suggestion in this patent that employing the partially hydrolyzed silane in polymers other than the synthetic or natural rubbers recited therein would result in better adhesion than employing the unhydrolyzed silane. British Pat. No. 1,485,517 suggested similar prehydrolyzed silanes as improved primers to facilitate adhesion between composite materials. The materials mentioned included polyvinyls as well as many others. This patent does not suggest that prehydrolyzed silanes could be incorporated in the polymer compositions in any way to increase the adherence of coatings of the polymers to substrates.

SUMMARY OF THE INVENTION

Applicant has discovered a method of producing a vinyl chloride based coating composition having improved adhesion to substrates, comprising forming a mixture of (A) a vinyl chloride based plastisol or organosol and (B) a devolatilized product of hydrolysis of an aminofunctional organotrialkoxysilane with at least 0.5 moles of water per mole of the silane, the mixture containing 0.1 to 2 percent by weight of (B) based on the combined weights of (A) and (B), the aminofunctional organotrialkoxysilane having the general formula

wherein R is a monovalent alkyl radical of from 1 to 3 inclusive carbon atoms and x is zero or 1. Further applicant has found that undesirable side effects from mixing (A) and (B) such as increase in viscosity of the mixture and discoloration in the fused films, can be reduced by including in the mixture, 0.5 to 1.1 mole per mole of primary amino group in the hydrolyzed silane product of a compatible carboxylic acid boiling above 150° C. at atmospheric pressure.

DETAILED DESCRIPTION OF THE INVENTION

This invention is based on the discovery that combining a partially or completely hydrolyzed product of an aminofunctional organotrialkoxysilane with a vinyl chloride based plastisol or organosol improves the adhesion of fused plastisol or organosol films to substrates. The adhesion thus obtained is significantly greater than when the same amount of the unhydrolyzed aminofunctional organotrialkoxysilane is combined with the plastisol or organosol. Essentially, it has been found that the ability of an aminofunctional organotrialkoxysilane to improve the adhesion to substrates of PVC plastisol or organosol coatings is greatly increased when the silane has been partially or completely hydrolyzed prior to addition to the plastisol or organosol.

In accordance with the practice of the present invention, the aminofunctional organotrialkoxysilane is hydrolyzed with at least 0.5 moles of water per mole of silane. The hydrolysis of the silane can be carried out in any convenient manner such as stirring the silane and water together or forming a solution of the silane and water in a mutual solvent. The hydrolysis can be effected at elevated temperatures but this is not necessary since it proceeds readily at room temperature. No catalyst is required for the hydrolysis as the aminofunctionality of the silanes themselves catalyze the hydrolysis as those skilled in the art will recognize. It should be understood that when 1.5 or more moles of water per mole of silane is employed to hydrolyze the trialkoxysilane, complete hydrolysis will occur and the siloxane product will have essentially no alkoxy groups bonded to silicon remaining. When less than 1.5 moles of water per mole of silane is employed, only partial hydrolysis can occur and the product will have some alkoxy groups bonded to silicon remaining. There is no known maximum amount of water that can be used, however, any amount in excess of 1.5 moles per mole of trialkoxysilane serves no purpose and only leads to additional expense when it is later removed.

In a preferred embodiment of the present invention the organotrialkoxysilane is hydrolyzed with 0.5 to 1.0 moles of water per mole of the silane to obtain a product that gives maximum improvement in adhesion of PVC plastisols or organosols and has a viscosity convenient for use after devolatilization.

The hydrolysis product of the aminofunctional organotrialkoxysilane must be devolatilized to be useful in the present invention. If the hydrolysis product is not devolatilized, the low boiling alcohols formed when the trialkoxysilane is hydrolyzed and any excess water or low boiling solvents present, will rapidly vaporize during fusion of the plastisol or organosol coating. This rapid vaporization causes bubbles in the coating which greatly reduces the value of the coating. The hydrolysis product can be devolatilized in any convenient manner such as heating to an elevated temperature at atmospheric or lower pressure.

The hydrolysis product may be dissolved in a compatible liquid alcohol boiling above 150° C. at atmospheric pressure and then heated to devolatilize the solution of low boiling compounds. This latter method is especially preferred when the trialkoxysilane has been completely or nearly completely hydrolyzed since it prevents gelling of the hydrolyzed product and provides a convenient liquid solution for combining with the plastisol or organosol. It is preferred that the hydrolysis product, whether dissolved in the alcohol solvent or not, be devolatilized of essentially all substances boiling below 150° C. at atmospheric pressure.

Aminofunctional organotrialkoxysilanes operable in the present invention have the general formula $$(RO)_3SiCH_2CH_2CH_2NH(CH_2CH_2NH)_xH$$

wherein R is a monovalent alkyl radical of from 1 to 3 inclusive carbon atoms and x is zero or 1. Typical examples of silanes that may be hydrolyzed partially or completely in accordance with the present invention are: N-(2-aminoethyl)-3-aminopropyltrimethoxysilane (1), 3-aminopropyltriethoxysilane (2) and 3-aminopropyltriisopropoxysilane.

As already mentioned, the devolatilized silane hydrolysis product (B) may be dissolved in a compatible liquid alcohol boiling above 150° C. at atmospheric pressure. Alcohols boiling below 150° C. are also good solvents for the hydrolysis products, but such alcohols vaporize rapidly during fusion and cause undesirable bubbles in the coating. Alcohols that may be employed as solvents include alkyl and arylalkyl alcohols such as: 2-ethylhexanol, 1-decanol, 1-octanol, 1-tridecanol, benzyl alcohol and 2-phenylethanol. The silane hydrolysis product can be dissolved in 10 to 75 percent by weight alcohol based on the total weight of the silane hydrolysis product. It is not necessary to employ an alcohol solvent when the trialkoxysilane is hydrolyzed according to the preferred embodiment using 0.5 to 1.0 moles of water per mole of silane. When more water is used, however, it is preferred to employ the alcohol solvent as described.

Applicant has found that the improved adhesion is obtained when the plastisol or organosol contains 0.1 to 2 percent by weight of the devolatilized hydrolysis product (B) based on the combined weight of the plastisol or organosol and (B). When (B) is added to the plastisol or organosol as an alcohol solution, the weight of the solvent or any other component of the solution is not included in the weight of (B). Although more than 2 percent (B) can be added to a plastisol or organosol, the adhesion begins to fall off at that level so that for maximum adhesion and better economy less than 2 percent (B) is preferred.

The vinyl chloride based plastisols and organosols (A) that can be employed in the present invention are well known in the art. They are dispersions of fine particle size polyvinyl chloride (PVC) resins in plasticizers. The vinyl chloride resins include homopolymeric vinyl chloride polymers and copolymeric vinyl chloride polymers containing at least 75 mole percent vinyl chloride monomer units. The remaining units of the copolymeric vinyl chloride polymers may contain comonomers such as vinyl acetate, ethylene, propylene, vinylidene chloride and many others as known in the art. Preferably the PVC resins have a particle size from 0.1 to 100 microns. A single PVC polymer or a mixture of PVC polymers may be used. The plasticizers employed in plastisols and organosols are liquid organic solvents in which the PVC resin is soluble only at elevated temperatures (e.g. at the temperatures at which the coating composition may be fused to produce a coating). When the sole solvent or major part of the solvent is a relatively non-volatile compound of this type the dispersion is a plastisol. When a significant portion of the solvent is a volatile compound that slowly evaporates during fusion of the coating, the composition is an organosol. Commonly used solvents in organosols and plastisols include dialkyl ketones (e.g., diisobutyl ketone, methyl isobutyl ketone), dialkyl phthalates, (e.g. di(2-ethylhexyl)ortho-phthalate, di(n-octyl)ortho-phthalate) and dialkyl adipates (e.g. di(2-ethylhexyl)adipate). A single organic solvent or mixtures of organic solvents may be used. The amount of organic solvent employed is usually from 40 to 100 parts by weight of solvent per 100 parts by weight of the PVC resin.

The practice of the present inventions can provide PVC coatings with improved adhesion on many substrates. The substrates include glass, metals such as steel and aluminum, and fabrics such as glass, Dacron®, Nylon, Acrylic and Kevlar®. The optimum temperature for fusing the coating varies with the substrate and plastisol, but is usually from about 140° C. to 180° C. One advantage of the present invention is that excellent adhesion is often obtained at a low (e.g. 140°–160° C.) fusion temperature.

In one embodiment of the present invention the coating mixture formed contains 0.5 to 1.1 mole per mole of organosilane hydrolysis product of a compatible carboxylic acid boiling above 150° C. at atmospheric pressure. The acid may be added to the mixture in any convenient manner. It may be added to the plastisol before or after the silane hydrolysis product is added. Alternatively, it may be combined with the silane hydrolysis product before the product is mixed into the plastisol or organosol. The purpose of the carboxylic acid is to stabilize the viscosity of the coating compositions prepared by the method of the present invention. The carboxylic acid has been found to reduce the increase in viscosity that may occur when the coating compositions of the present invention are stored for several days prior to use. Moreover, coatings containing the carboxylic acid often show less discoloration upon fusion. Consequently, it is preferred that the coating compositions contain the carboxylic acid when the compositions are to be stored before use and/or discoloration of the coating is undesirable.

Carboxylic acids that have been found especially effective in stabilizing the viscosity of the instant coating compositions include methacrylic acid and monoesters of dicarboxylic acids of the general formula

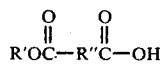

wherein R' is a monovalent alkyl radical of 4 to 10 carbon atoms and R" is an alkylene radical of 1 to 4 carbon atoms or the phenylene radical. Monoesters of dicarboxylic acids that can be employed include butyl hydrogen phthalate, octyl hydrogen isophthalate, decyl hydrogen terephthalate, octyl hydrogen succinate, decyl hydrogen adipate and butyl hydrogen malonate. Mixtures of two or more of the carboxylic acids may also be employed.

Various additives can be incorporated into the coating compositions to impart special properties or to extend the compositions. By way of illustration, stabilizers such as organo tin compounds can be added to minimize thermal decomposition of the coatings; powdered metals or metal oxides (e.g. powdered titanium dioxide or antimony oxide and powdered aluminum) can be added to impart color to the coatings; and fillers such as alumina trihydrate and calcium carbonate may be added to extend the coating compositions.

The following examples are presented to illustrate the invention, but the examples in no way limit the scope of the invention as more fully set out in the claims.

EXAMPLE 1

This example shows the improved adhesion to various substrates of a fused vinyl chloride film containing an aminofunctional organosilane prereacted with different amounts of water.

A series of hydrolysis products of N-(2-aminoethyl)-3-aminopropyltrimethoxysilane (1) were prepared by adding various amounts of water to 50% solutions of the silane in methanol. The solutions were refluxed for 1 hour and then sufficient 1-decanol was added to give the desired residual solids content. Volatiles were removed from the stirred mixture by warming to 60°–70° C. under a final pressure of 2–5 mm of Hg.

A vinyl chloride plastisol (2) was prepared by mixing 100 parts by weight of a dispersion grade homopolymer of vinyl chloride, 80 parts by weight of dioctylphthalate and 2 parts by weight of dibutyl tin dilaurate (stabilizer for thermal degradation) under shear in a Waring Blender. The 1-decanol solutions of the hydrolysis products of silane (1) were added to the plastisol to give 1 percent by weight silane product based on total plastisol weight.

Films of the plastisol were fused 5 minutes at 150° C. on glass microscope slides, aluminum panels, steel panels and Dacron® fabric. The films were 30 to 50 mils thick. Peel strengths of the films were measured by a dead weight static peel test in which the force required to initiate peel of a one inch wide strip of film was determined. The peel strengths were all measured at an angle of 90°. The data is shown in Table 1. The symbol "N/m" means Newtons per meter.

TABLE 1

| Mole Ratio Water to Silane (I) Reacted | Peel Strength (N/m × 10$^{-2}$) | | | |
|---|---|---|---|---|
| | Glass | Al | Steel | Dacron |
| Control (No silane) | Nil | Nil | Nil | 2.8 |
| 0* | 7.8 | 7.0 | 6 | 6.3 |
| 0.5 | 10.6 | 20 | 9.8 | — |
| 0.7 | 16.5 | 25.5 | 14 | 12.5 |
| 1.0 | 21 | 21 | 15 | 9.4 |
| 1.5 | 18.5 | — | — | 12.5 |
| 3.0 | 17.7 | — | — | 12.0 |

*Comparison test with no prehydrolysis of the silane.

EXAMPLE 2

This example shows the preparation without employing an alcohol solvent of a hydrolyzate of silane (1) which when combined with a plastisol results in excellent adhesion.

A mixture of 222 g. of silane (1) and 9 g. of water were stirred for 1 hour at room temperature. A 110 g. portion of this mixture was devolatilized by heating to 80° C. under a final pressure of 10 mm Hg. There remained 97 g. of partially hydrolyzed silane. A coating composition was formed by combining plastisol (2) and 1 percent of the partially hydrolyzed silane based on the total plastisol weight. A film of the composition was fused 15 minutes at 150° C. on a glass microscope slide. The peel strength measured as in Example 1 was 12.7×10$^{-2}$ N/m.

EXAMPLE 3

This example shows the improved adhesion of a fused vinyl chloride film containing different amounts of silane (1) prereacted with water.

A 50 percent 1-decanol solution of the hydrolysis product of silane (1) with 0.7 moles of water per mole of silane was prepared as in Example 1. Portions of this silane solution (3) were added to the vinyl chloride plastisol (2) of Example 1, and films of the modified plastisol were fused 5 minutes at 150° C. on glass microscope slides, aluminum panels and cold-rolled steel sheets. The peel strengths of the films were determined as in Example 1 and are shown in Table 2.

TABLE 2

| Percent Silane Product Added Based on Total Plastisol Weight | Peel Strengths (N/m × $10^{-2}$) | | |
|---|---|---|---|
| | Glass | Al | Steel |
| None | Nil | Nil | Nil |
| 0.1 | 7.8 | 5.1 | 1.2 |
| 0.2 | 13.7 | 11.8 | 3.9 |
| 0.4 | 20.0 | 23.5 | 11.8 |
| 0.6 | 21.6 | 25.5 | 11.8 |
| 0.8 | 25.5 | 21.5 | 13.7 |
| 1.0 | 16.5 | 25.5 | 13.7 |

EXAMPLE 4

This example compares the adhesion obtained when 3-aminopropyltriethoxysilane (4) is employed in three different ways to make plastisol coating compositions.

The first composition was prepared by treating a dispersion grade homopolymer of vinyl chloride with an aqueous-methanol solution of silane (4) and evaporating the solvent to deposit 0.5 percent by weight of silane (4) hydrolysis product on the PVC powder. Coating composition I was then formed by dispersing under shear in a Waring Blender 100 parts by weight of this treated PVC in 100 parts by weight of dioctylphthalate.

Coating compositions II and III were prepared by first forming a plastisol by dispersing under shear in a Waring blender 100 parts by weight of the homopolymer of vinyl chloride in 100 parts by weight of dioctylphthlate. Compositions II were then completed by adding various amounts of unhydrolyzed silane (4). Compositions III were completed by adding similar amounts of silane (4) which had been hydrolyzed with 0.7 moles of water per mole of silane and devolatilized to remove substances boiling below 150° C. at atmospheric pressure. Hydrolyzed silane (4) was added to the plastisol as a 50% solution in 1-decanol.

The compositions were coated on glass microscope slides and fused 5 or 15 minutes at 150° C. to form 30–50 mil films. The peel strengths in Table 3 were determined as in Example 1.

TABLE 3

| Percent by Weight Silane Additive Based on Total Plastisol Weight | Peel Strengths (N/m × $10^{-2}$) | | | | | |
|---|---|---|---|---|---|---|
| | 5 min. fusion Compositions | | | 15 min. fusion Compositions | | |
| | I | II | III | I | II | III |
| 0.25 | 6.7* | 4.6 | 5.1 | 12.0* | 9.3 | 15.2 |
| 0.5 | — | 5.8 | 7.0 | — | 10.0 | 21.0 |
| 1.0 | — | 8.8 | 14.3 | — | 15.6 | 27.0 |
| 2.0 | — | 7.7 | 13.6 | — | 5.8 | 23.2 |

*Hazy Film

EXAMPLE 5

This example shows the improved adhesion of a composition containing prereacted silane fused at different temperatures.

A 50 percent by weight solution of silane (1) hydrolyzed with 0.7 mole of water per mole of silane as in Example 1 was prepared in mixed 1-decanol and 1-octanol solvent. Coating composition (I) was prepared by adding 1 percent by weight of this solution to plastisol (2). For comparison coating composition (II) was prepared by adding 1 percent by weight of a 50 percent solution of unhydrolyzed silane (1) in the same solvent to plastisol (2). The compositions were fused for 5 minutes at different temperatures on cold rolled steel panels.

The peel strengths of the films were determined as in Example 1 and are shown in Table 4.

TABLE 4

| | Percent Silane Product Based On Total Plastisol | Peel Strength (N/m × $10^{-2}$) | | | | |
|---|---|---|---|---|---|---|
| | | 140° C. | 150° C. | 160° C. | 170° C. | 180° C. |
| I | 0.5 | 8.8 | 14 | >20[1] | >20[1] | >20[1] |
| II | 0.5 | 3.6 | 6 | 10 | 10 | 12.8 |

[1]Cohesive failure in film.

EXAMPLE 6

Two sets of fabric sandwiches were prepared, one employing plastisol (2) (Example 1) modified with 2 percent by weight of silane solution (3) and another employing similarly modified plastisol (2) filled with 33 percent by weight calcium carbonate (2.6 to 2.9 micron crushed limestone). For comparison, fabric sandwiches were also prepared from the same plastisols without the added silane solution (3) (Example 3). All the fabric sandwiches were fused 3 minutes at 175° C. The peel strengths of the fabric sandwiches were determined as in Example 1 and are shown in Table 5.

TABLE 5

| Compositions | | Peel Strengths (N/m × $10^{-2}$) | | | | |
|---|---|---|---|---|---|---|
| Filled With CaCO3 | Percent Silane Product Based on Total Plastisol | Glass | Kevlar ® | Nylon | Dacron ® | Acrylic |
| 0 | 0 | 19 | 18 | 6 | 9 | 34 |
| 0 | 1 | >27[1] | 33 | 27 | 22 | 67[2] |
| 33% | 0 | 5 | 8 | 7 | 6 | 11 |
| 33% | 1 | >27[1] | 30 | 20 | 33 | 50[2] |

[1]Glass fabric unraveled
[2]Cohesive failure in film

The properties of the above plastisols and a sheet formed by fusing the plastisol in a silicone rubber mold (2.5"×4"×0.125") for 30 minutes at 150° C. were determined using ASTM D676 for durometer and ASTM D412 for tensile and elongation.

TABLE 6

| Plastisol | | | Properties of Fused Sheet | | |
|---|---|---|---|---|---|
| Filled With CaCO3 | Percent Silane Product Based On Total Plastisol | Viscosity Upon Mixing (Pa · s) | Durometer Hardness | Tensile (psi) | Elongation (percent) |
| 0 | 0 | 3.1 | 56 | 1,120 | 420 |
| 0 | 1 | 2.6 | 59 | 1,270 | 355 |
| 33% | 0 | 20.3 | 64 | 600 | 230 |

TABLE 6-continued

| Filled With $CaCO_3$ | Plastisol Percent Silane Product Based On Total Plastisol | Viscosity Upon Mixing (Pa . s) | Properties of Fused Sheet | | |
|---|---|---|---|---|---|
| | | | Durometer Hardness | Tensile (psi) | Elongation (percent) |
| 33% | 1 | 10.0 | 65 | 680 | 220 |

EXAMPLE 7

This example shows the improved viscosity stability of the coating compositions obtained by the method of this invention which contain high boiling carboxylic acids combined with the hydrolyzed silane.

A 50 percent by weight solution of silane (1) hydrolyzed with 0.7 mole of water per mole of silane was prepared in a mixed 1-decanol/1-octanol solvent by the procedure of Example 1. Carboxylic acids were then added to the solution of hydrolyzed silane with mixing. Coating compositions were prepared by combining 100 parts by weight of aluminatrihydrate filler (particle size 7 to 9 microns), 180 parts by weight of plastisol (2) and a sufficient amount of the above silane-acid mixture to give 1 percent by weight of silane based on the weight of the total mix.

The viscosity of the compositions were measured one hour after first mixing without additional mixing before the measurement. Additionally the viscosities of the compositions were measured after standing 1 and 5 days with remixing just prior to the viscosity measurement.

Peel strengths of films formed by fusing the compositions on glass microscope slides for 5 minutes at 175° C. were determined as in Example 1. The color of each fused film was also ranked on a scale of 1 to 6 where 1 indicates the least color formation. The data are shown in Table 7 which also includes for comparison the data obtained with similar compositions employing hydrolyzed silane (1), but without the high boiling carboxylic acid.

TABLE 7

| Mole Ratio Acid To Primary Amino Group | High Boiling Acid | Viscosity of Mix (Pa . s) | | | Peel Strength (N/m × $10^{-2}$) | Color |
|---|---|---|---|---|---|---|
| | | 1 Hour | 1 Day | 5 Days | | |
| Control (No Silane) | None | 15.8 | 13.3 | 19.0 | nil | 1 |
| Silane Only | None | 35.0 | 28.5 | 38.2 | 15.4 | 4 |
| 0.5 | Butyl Hydrogen Phthalate | 26.1 | 16.3 | 27.9 | 15.4 | 3 |
| 1.0 | Butyl Hydrogen Phthalate | 17.8 | 12.5 | 22.0 | 15.4 | 3 |
| 1.5 | Butyl Hydrogen Phthalate | 19.0 | 12.3 | 22.0 | 10.8 | 3 |
| 1.0 | Decyl Hydrogen Phthalate | 16.8 | 20.0 | 35.5 | 15.4 | 3 |

EXAMPLE 8

A series of coating compositions were prepared as in Example 5 except that calcium carbonate (2.6 to 2.9 micron crushed limestone) was employed as filler instead of aluminum trihydrate. The viscosities of the compositions were measured 1 hour after preparation without additional mixing and also measured 5 days later with remixing prior to the measurement. Peel strengths and color rankings were determined as in Example 5. The data are shown in Table 8 which also includes for comparison the data obtained with similar compositions employing hydrolyzed silane (1), but without the high boiling carboxylic acid.

TABLE 8

| Mole Ratio Acid To Primary Amino Group | High Boiling Acid | Viscosity of Mix (Pa . s) | | Peel Strength (N/m × $10^{-2}$) | Color |
|---|---|---|---|---|---|
| | | 1 Hour | 5 Days | | |
| No Silane Control | None | 14.4 | 17.0 | nil | 1 |
| Silane (1) | None | 31.0 | 41.0 | 19.3 | 4 |
| 0.5 | Butyl Hydrogen Phthalate | 15.5 | 21.5 | 15.4 | 3 |
| 1.0 | Butyl Hydrogen Phthalate | 13.25 | 17.5 | 19.3 | 3 |
| 1.5 | Butyl Hydrogen Phthalate | 8.5 | 13.2 | 12.3 | 3 |
| 1.0 | Decyl Hydrogen Phthalate | 16.1 | 28.0 | 15.8 | 3 |

EXAMPLE 9

Solution I, a 50 percent solution of octyl hydrogen phthalate and decyl hydrogen phthalate in mixed 1-decanol/1-octanol was prepared by heating a mixture of 82.4 g. of Epal 810 (a commercially available mixture from Ethyl Corporation of approximately half 1-decanol and half 1-octanol), 29.6 g. of phthalic anhydride and 1 g. of triethylamine up to 120° C. Then 1.46 parts by weight of solution I was combined with 1 part by weight of the 50 percent hydrolyzed silane (1) solution described in Example 7 to give solution II containing 1 mole of carboxylic acid per mole of primary amino group.

Sufficient amount of solution II was added to the plastisol of Example 1 to provide 1 percent by weight of hydrolyzed silane product in the plastisol based on the combined weight of the plastisol and solution II.

Similar plastisol compositions using a mixture of decyl and octyl hydrogen succinate and a solution of methacrylic acid were also prepared. The viscosity of the compositions were measured 1 hour after their preparation without remixing prior to the measurement. The viscosity was measured again 1 day and 7 days later with remixing of the composition just prior to the measurement. The peel strength of the compositions fused on glass microscope slides at 150° C. for 15 minutes were measured as described in Example 1. The results are shown in Table 9.

TABLE 9

| Percent Silane Hydrolysis Product[a] | High Boiling Acid | Viscosity of Mix (Pa . s) | | | Peel Strength (N/m × $10^{-2}$) |
|---|---|---|---|---|---|
| | | 1 Hour | 1 Day | 7 Days | |
| 0 | None | 9.75 | 11.1 | 15.8 | <.35 |
| 1 | None | 29.5 | 44.0 | 84.0 | >17.4[b] |
| 1 | Methacrylic Acid | 15.5 | 16.0 | 18.75 | 12.7 |
| 1 | Decyl & Octyl | 22.5 | 19.25 | 26.7 | 10.4 |

TABLE 9-continued

| Percent Silane Hydrolysis Product[a] | High Boiling Acid | Viscosity of Mix (Pa·s) 1 Hour | 1 Day | 7 Days | Peel Strength (N/m × $10^{-2}$) |
|---|---|---|---|---|---|
| 1 | Hydrogen Phthalate Decyl & Octyl Hydrogen Succinate | 11.2 | 19.0 | 17.0 | 13.5 |

[a] Does not include weight of carboxylic acid or solvent.
[b] Cohesive failure of the coating.

That which is claimed is:

1. A method of producing a resinous vinyl chloride polymer based coating composition having improved adhesion to substrates, comprising combining (A) a dispersion of resinous vinyl chloride polymer, containing at least 75 mole percent vinyl chloride monomer units, in plasticizer, (B) a product of hydrolysis of an amino-functional organotrialkoxysilane with at least 0.5 moles of water per mole of the silane which product is devolatilized of essentially all substances boiling below 150° C. at atmospheric pressure, and (C) a filler, to form a mixture consisting essentially of (A), (B) and (C), the mixture containing 0.1 to 2 percent by weight of (B) based on the combined weights of (A), (B) and (C) the aminofunctional organotrialkoxysilane having the general formula $$(RO)_3SiCH_2CH_2CH_2NH(CH_2CH_2NH)_xH$$

wherein

R is a monovalent alkyl radical of from 1 to 3 inclusive carbon atoms, and x is zero or 1.

2. The method as recited in claim 1 wherein the filler is aluminatrihydrate or calcium carbonate.

* * * * *